US008606755B2

(12) United States Patent
Cohen et al.

(10) Patent No.: US 8,606,755 B2
(45) Date of Patent: Dec. 10, 2013

(54) MAINTAINING A MIRRORED FILE SYSTEM FOR PERFORMING DEFRAGMENTATION

(75) Inventors: Ofir D. Cohen, Hafia (IL); Daniel Katz, Hafia (IL); Uri Wolloch, Hafia (IL); Alexey Yarovinsky, Hafia (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/349,470

(22) Filed: Jan. 12, 2012

(65) Prior Publication Data
US 2013/0185264 A1 Jul. 18, 2013

(51) Int. Cl.
*G06F 7/00* (2006.01)
*G06F 17/00* (2006.01)
(52) U.S. Cl.
USPC .......................................... 707/658; 707/659
(58) Field of Classification Search
None
See application file for complete search history.

(56) References Cited

U.S. PATENT DOCUMENTS

| 7,945,724 | B1* | 5/2011 | Smith et al. ............... 711/103 |
| 2002/0087823 | A1* | 7/2002 | Chow et al. ............... 711/170 |
| 2004/0128442 | A1 | 7/2004 | Hinshaw et al. |
| 2004/0165540 | A1 | 8/2004 | Acharya et al. |
| 2005/0022051 | A1 | 1/2005 | Zane et al. |
| 2006/0010301 | A1* | 1/2006 | Yagawa ....................... 711/163 |
| 2007/0255925 | A1* | 11/2007 | Serizawa et al. ............ 711/202 |
| 2008/0270461 | A1* | 10/2008 | Gordon et al. ............ 707/103 R |
| 2008/0270706 | A1* | 10/2008 | Fair et al. ..................... 711/137 |
| 2008/0288710 | A1* | 11/2008 | Maeda et al. ................ 711/102 |
| 2009/0198946 | A1* | 8/2009 | Ebata ........................... 711/171 |
| 2009/0228535 | A1* | 9/2009 | Rathi et al. ................... 707/204 |
| 2011/0179224 | A1 | 7/2011 | Rossi |
| 2011/0202722 | A1* | 8/2011 | Satran et al. .................. 711/114 |
| 2012/0239860 | A1* | 9/2012 | Atkisson et al. ............ 711/103 |

* cited by examiner

*Primary Examiner* — Usmaan Saeed
*Assistant Examiner* — Dung K Chau
(74) *Attorney, Agent, or Firm* — Rabindranath Dutta; Konrad, Raynes, Davda and Victor LLP

(57) ABSTRACT

A computational device maintains logical mirroring of a first file system with a second file system. A first set of input/output (I/O) requests is satisfied from the first file system while the second file system is undergoing defragmentation. A second set of I/O requests is satisfied from the second file system while the first file system is undergoing defragmentation.

14 Claims, 8 Drawing Sheets

MAINTAINING A MIRRORED FILE SYSTEM FOR PERFORMING DEFRAGMENTATION

BACKGROUND

1. Field

The disclosure relates to a method, system, and article of manufacture for maintaining a mirrored file system for performing defragmentation.

2. Background

Locality of reference may cause related storage locations to be sequentially accessed in a file system. Often when an application starts to read a file, the application may read the entire file. In such a situation, it may be desirable to maintain the entire file in contiguously located space in a storage device.

A file system may undergo fragmentation, when the file system is unable to allocate enough contiguous space to store a complete file as a unit. In such a situation, the file system may place parts of the file in gaps between other files. These gaps may exist because they formerly held a file that the operating system has subsequently deleted, or because the file system allocated excess space for the file in the first place. Larger files and greater numbers of files also contribute to fragmentation and consequent loss of performance.

A fragmented file system may cause a degradation of performance while satisfying input/output (I/O) operations from applications. In a fragmented file system locality of reference of data may not be preserved, and the I/O patterns on the storage devices may become more random than sequential.

In the maintenance of file systems, defragmentation is a process that reduces the amount of fragmentation. Defragmentation physically organizes the contents of the mass storage device used to store files into a number of contiguous regions. It also attempts to create larger regions of free space by using compaction to impede the return of fragmentation. Defragmentation consolidates the data of files to store the data in contiguous space and reduces the fragmentation problem, and as a result improves I/O performance. Although defragmentation in contemporary file systems does not require applications to stop execution, defragmentation is time consuming and affects the performance of applications.

SUMMARY OF THE PREFERRED EMBODIMENTS

Provided are a method, a system, and a computer program product in which a computational device maintains logical mirroring of a first file system with a second file system. A first set of input/output (I/O) requests is satisfied from the first file system while the second file system is undergoing defragmentation. A second set of I/O requests is satisfied from the second file system while the first file system is undergoing defragmentation.

In additional embodiments, the first and second file systems alternately undergo defragmentation.

In further embodiments, the first file system and the second file system correspond to a primary file system and a secondary file system, wherein I/O requests are satisfied from the primary file system and defragmentation is performed on the secondary file system. In certain embodiments, while satisfying the first set of I/O requests from the first file system while the second file system is undergoing defragmentation, the first file system is the primary file system and the second file system is the secondary file system. In certain other embodiments, while satisfying the second set of I/O requests from the second file system while the first file system is undergoing defragmentation, the first file system is the secondary file system and the second file system is the primary file system.

In yet further embodiments, while the secondary file system is being defragmented, read requests are satisfied by the primary file system. Also, write requests are synchronously satisfied by the primary file system, and placed in queue for the secondary file system for an asynchronously update.

In additional embodiments, a write request is received and a determination is made that the primary file system and the secondary file system are switching states with each other. In response to determining that the primary file system and the secondary file system are switching states with each other, the computational device waits for satisfying the write request until the primary file system and the secondary file system have completed switching states with each other.

In further embodiments, the logical mirroring of the first file system with the second file system is performed by maintaining same file structures and data on the first and the second file system, wherein the data is mapped differently on volumes of the first and the second file system.

In yet further embodiments, after completing defragmentation, the first and the second file system are synchronized by performing queued operations.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Avoiding Impact of Defragmentation on I/O Operations

When a file system is undergoing defragmentation, applications may have to wait for a longer period of time to perform read, write, and other I/O operations on the file system.

Certain embodiments maintain two file systems that are logically mirrored with respect to each other. The logical mirroring causes the two file systems to have the same files with the same data, although the layout of the files and the layout of the data may be different in the two file systems. While I/O is performed with respect to one file system the other file system undergoes defragmentation. After completing defragmentation of one file system, the defragmented file system is used for performing I/O, while the other file system is readied for defragmentation. As a result, the impact of defragmentation on I/O operations is reduced. The mirrored file systems alternately undergo defragmentation, and while one file system is undergoing defragmentation the other file system is used for performing I/O operations.

Exemplary Embodiments

Figure 1:
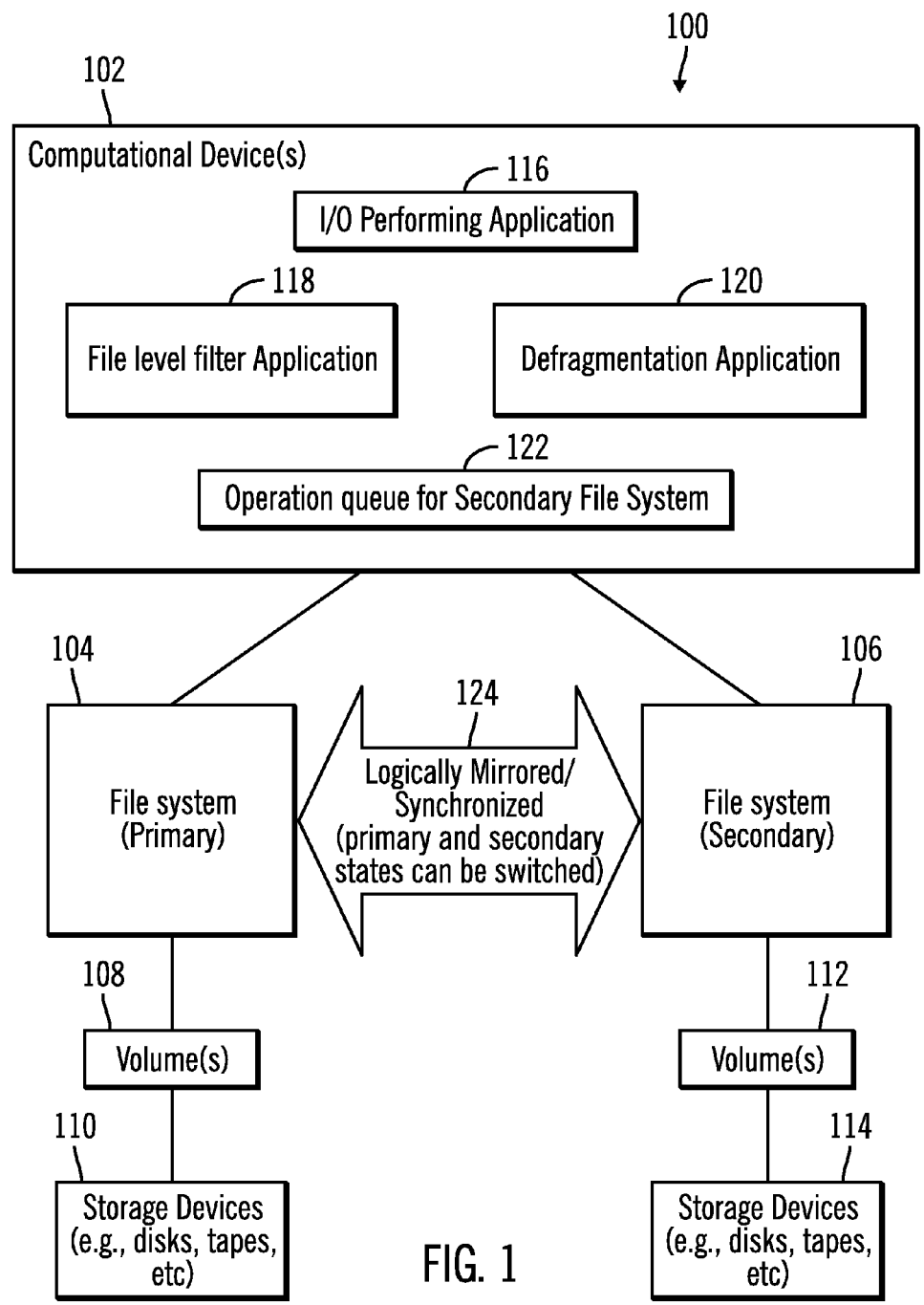
FIG. 1 illustrates a block diagram of a computing environment that includes a computational device controlling two file systems, in accordance with certain embodiments.

FIG. 1 illustrates a block diagram of a computing environment 100 that includes a computational device 102 controlling two file systems 104, 106, in accordance with certain embodiments. One of the file systems is a primary file system 104 that is comprised of a plurality of volumes 108, where the plurality of volumes 108 are generated by configuring a plurality of storage devices 110. The other file system is a secondary file system 106 that is comprised of a plurality of volumes 112, where the plurality of volumes 112 are generated by configuring a plurality of storage devices 114.

The computational device 102 may comprise any suitable computational device including those presently known in the art, such as, a personal computer, a workstation, a server, a mainframe, a hand held computer, a palm top computer, a telephony device, a network appliance, a blade computer, a server, etc. The plurality of storage devices 110, 114 may comprise any suitable storage devices, such as physical hard disks, solid stage disks, tapes, etc., known in the art. In certain embodiments, the computational device 102 and the files systems 104, 106 may be part of a network.

The computational device 102 includes an I/O performing application 116, a file level filter application 118, a defragmentation application 120, and an operation queue 122 for the secondary file system. The I/O performing application 116 may comprise a user application, a system application, an operating system application, a device driver, etc., and may perform read, write, and other operations with respect to a file system.

The file level filter application 118 maintains the secondary file system 106 in a logically mirrored (reference numeral 124) state with the primary file system 104. The file level filter application 118 intercepts an I/O request made by the I/O performing application 116 and satisfies the I/O request from one of the primary file system 104 or the secondary file system 106. If the defragmentation application 120 is defragmenting the files system 106, then the file level filter application 118 satisfies the I/O request from the file system 104. After the file system 106 has been defragmented, then the file system 104 is readied for defragmentation and I/O requests are satisfied from the file system 106.

While a file system is being defragmented, write requests (and other requests that are not read requests) may be queued for the file system. For example, the operation queue 122 may store pending writes that are to be mirrored to the secondary file system 106 that is undergoing defragmentation. Once, the secondary file system 106 has completed defragmentation, the pending writes (and other requests) may be executed with respect to the secondary file system 106.

Therefore, FIG. 1 illustrates certain embodiments in which a file level filter application 118 intercepts I/O requests and satisfies the I/O requests from a file system that is not undergoing defragmentation. The other file system that is a mirror may be undergoing defragmentation. As a result, the impact of defragmentation on I/O response times may be decreased.

While FIG. 1 shows two exemplary file systems 104 and 106, in other embodiments there may be more than two file systems. For example, the primary file system 104 may be comprised of one or more file systems and the secondary file system 106 may be comprised of one or more file systems. In certain embodiments, a single primary file system may be logically mirrored to a plurality of secondary file systems. In other embodiments, a plurality of primary file systems may be logically mirrored to a single secondary file system. In certain alternative embodiments, a plurality of primary file system may be logically mirrored into a plurality of secondary file systems. In further embodiments, the primary and secondary file systems may be maintained in a hierarchical or a peer-to-peer relationship.

In certain further embodiments, one or more of the file systems 104, 106 shown in FIG. 1 may comprise virtual file systems. A hypervisor (i.e., a virtual machine manager) that provides hardware virtualization services may allow a plurality of operating systems to run concurrently on the computational device 102. Multiple instances of the plurality of operating systems may share virtualized hardware resources represented by the storage devices 110, 114 and virtual file systems may be implemented in certain embodiments on the virtualized hardware resources.

In further embodiments, the file systems 104, 106 can be stored on the same storage device instead of being stored in different storage devices as shown in FIG. 1. In certain embodiments, computing services may be provided by the computing environment 100. In such embodiments, shared resources, software, and information found within the computing environment 100 may be provided to computers and other devices as a metered service over a network, such as the Internet. For example, the defragmentation application 120 and the file level filter application 118 shown in FIG. 1 may provide a metered software service in a networked computing environment to one or more users.

Figure 2:
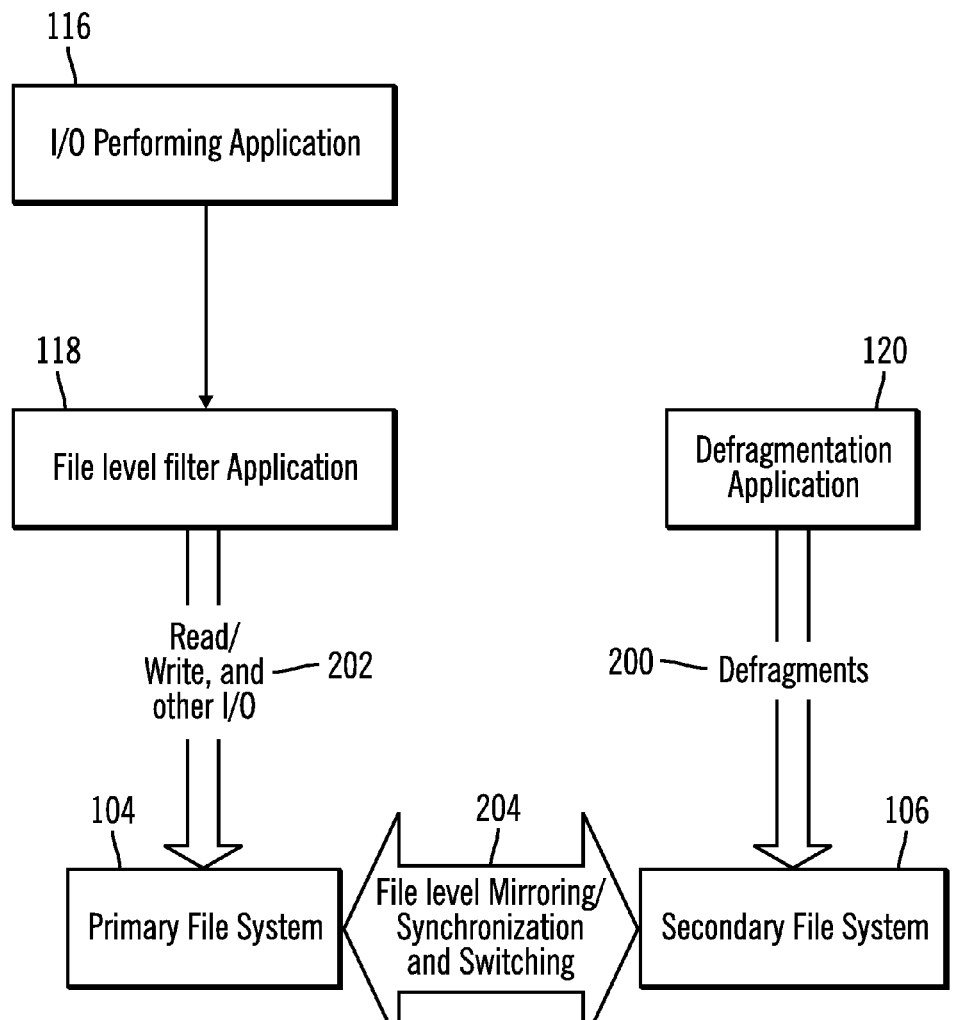
FIG. 2 illustrates a block diagram that shows a file level filter application and a defragmentation application executing operations on a primary and a secondary file system, in accordance with certain embodiments.

FIG. 2 illustrates a block diagram that shows a file level filter application 118 and a defragmentation application 120 executing operations on a primary 104 and a secondary 106 file system, in accordance with certain embodiments. The defragmentation application 120 defragments 200 the secondary file system 106, while the file level filter application intercepts I/O operations from the I/O performing application 116 and performs corresponding read, write, and other I/O 202 operations with respect to the primary file system 104. The file level filter application 118 also queues write and other I/O operations that involve modifications to the primary file system in the operation queue 122. When the defragmentation of the secondary file system 106 is completed, the operation queue 122 is emptied to synchronize the secondary file system 106 with the primary file system 104. The file level filter application 118 may then switch the primary file system 104 and the secondary file system 106 with each other.

Therefore, FIG. 2 illustrates certain embodiments in which a file level filter application 118 performs file level mirroring/synchronization 204 between a primary file system 104 and a secondary file system 106, and may also determine when to switch the two files system 104, 106 with each other. It should be noted that the secondary file system 106 is a file level mirror of the primary file system 104. A file level mirror means that these two file systems 104, 106 are logically identical (i.e., same file structure, data, etc.), but the file systems are separate and this means that the data may be mapped differently on the volumes of the file systems. This is different from a traditional mirror device where one side of the mirror is an exact block level image of the other side. In certain embodiments, the file level filter application 118 keeps the two files systems 104, 106 synchronized. The file level filter application 118 ensures that any event that happens to one file system is executed asynchronously on the other. It should be noted that the I/O performing application 116 is aware of only one file system and is not aware that there is a mirroring process that is being used by the file level filter application 118.

Figure 3:
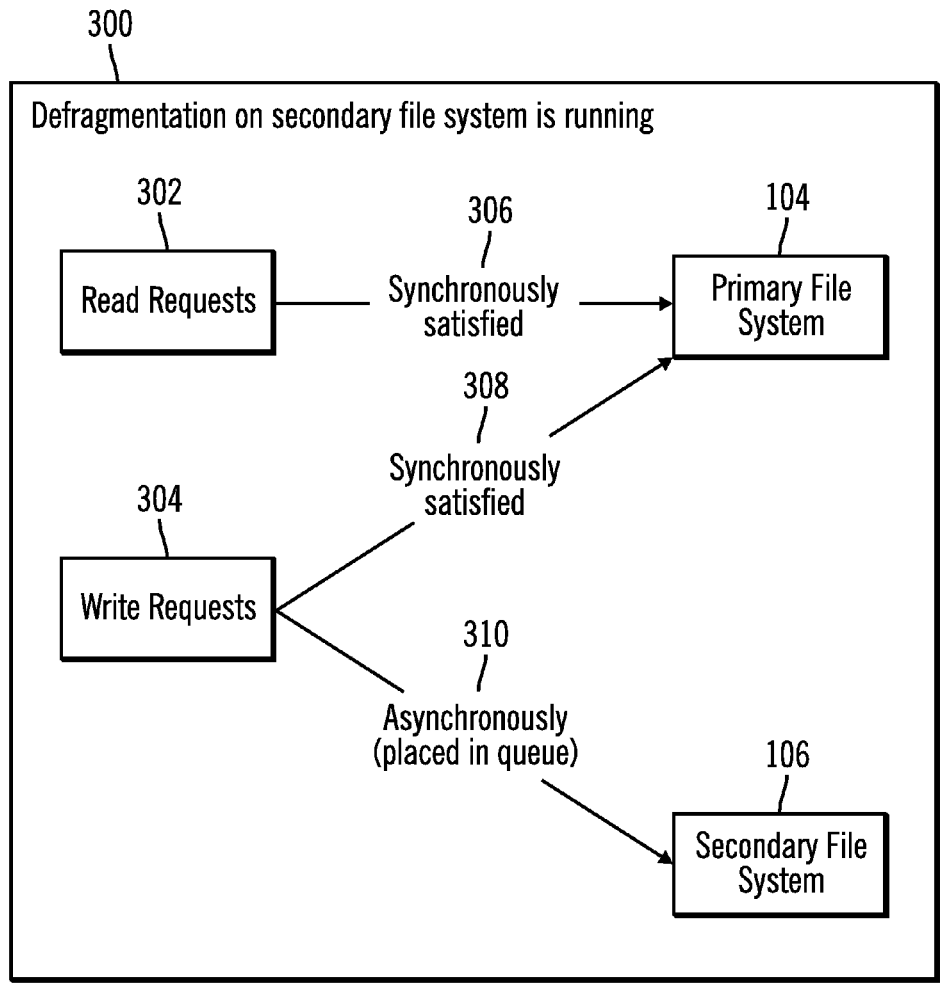
FIG. 3 illustrates a block diagram that shows how read and write requests are satisfied when a defragmentation process is executing on the secondary file system.

FIG. 3 illustrates a block diagram 300 that shows how read and write requests are satisfied when a defragmentation process is executing on the secondary file system.

Read requests 302 are satisfied synchronously 306 by the primary file system 104 which is not undergoing defragmentation. As a result, read requests can be satisfied much faster in comparison to situations where a file system is being defragmented and is expected to satisfy a read request.

Write requests 304 are also satisfied synchronously 308 by the primary file system 104 which is not undergoing defragmentation. As a result, write requests can be satisfied much faster in comparison to situations where a file system is being defragmented and is expected to satisfy a write request. However, since the secondary file system 106 is undergoing defragmentation, the write requests 304 are place in a queue and the secondary file system 106 is asynchronously updated when the secondary file system 106 has completed defragmentation.

Figure 4:
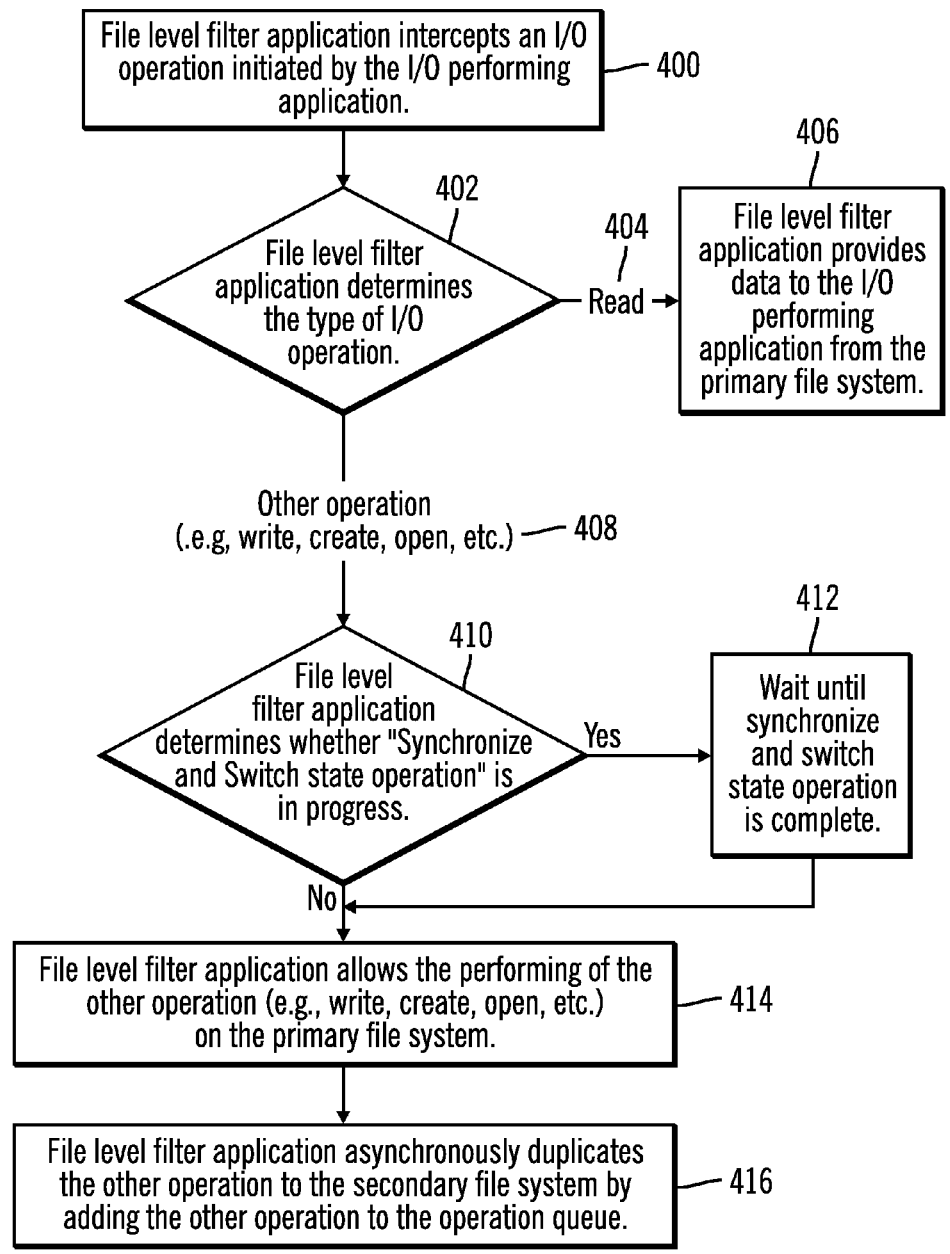
FIG. 4 illustrates a flowchart that shows first operations, in accordance with certain embodiments.

FIG. 4 illustrates a flowchart that shows first operations, in accordance with certain embodiments. The operations shown in FIG. 4 may be performed by the file level filter application 118 that executes in the computational device 102.

Control starts at block 400 in which the file level filter application 118 intercepts an I/O operation initiated by the I/O performing application 116. The file level filter application determines (at block 402) the type of I/O operation. If the type of I/O operation is read operation 404 then control proceeds to block 406 in which the file level filter application 118 provides data to the I/O performing application 116 from the primary file system 104.

If the type of I/O operation is not a read operation (reference numeral 408), then control proceeds to block 410 in which the file level filter application 118 determines (at block 410) whether a "synchronize and switch state operation" is in progress. During a synchronize and switch state operation the secondary file system is updated with operations, such as pending writes, that are pending in the operation queue 122, and then the roles of the primary and secondary file systems are switched. If a synchronize and switch state operation is in progress ("Yes" branch from block 410) then the process waits (at block 412) until the synchronize and switch state operation is completed before control proceeds to block 414.

If at block 410, the file level filter application 118 determines that the synchronize and switch state operation is not in progress ("No" branch from block 410) control proceeds to block 414 in which the file level filter application 118 allows the performing of the other operation (e.g., write, create, open, etc.) on the primary file system. Control proceeds to block 416 in which the file level filter application 118 asynchronously queues for duplication, the other operation to the secondary file system 106, by adding the other operation to the operation queue 122.

Therefore, FIG. 4 illustrates certain embodiments in which a file level filter application 118 intercepts I/O operations and returns results from a primary file system 104, and at the same time asynchronously updates the secondary file system 106.

Figure 5:
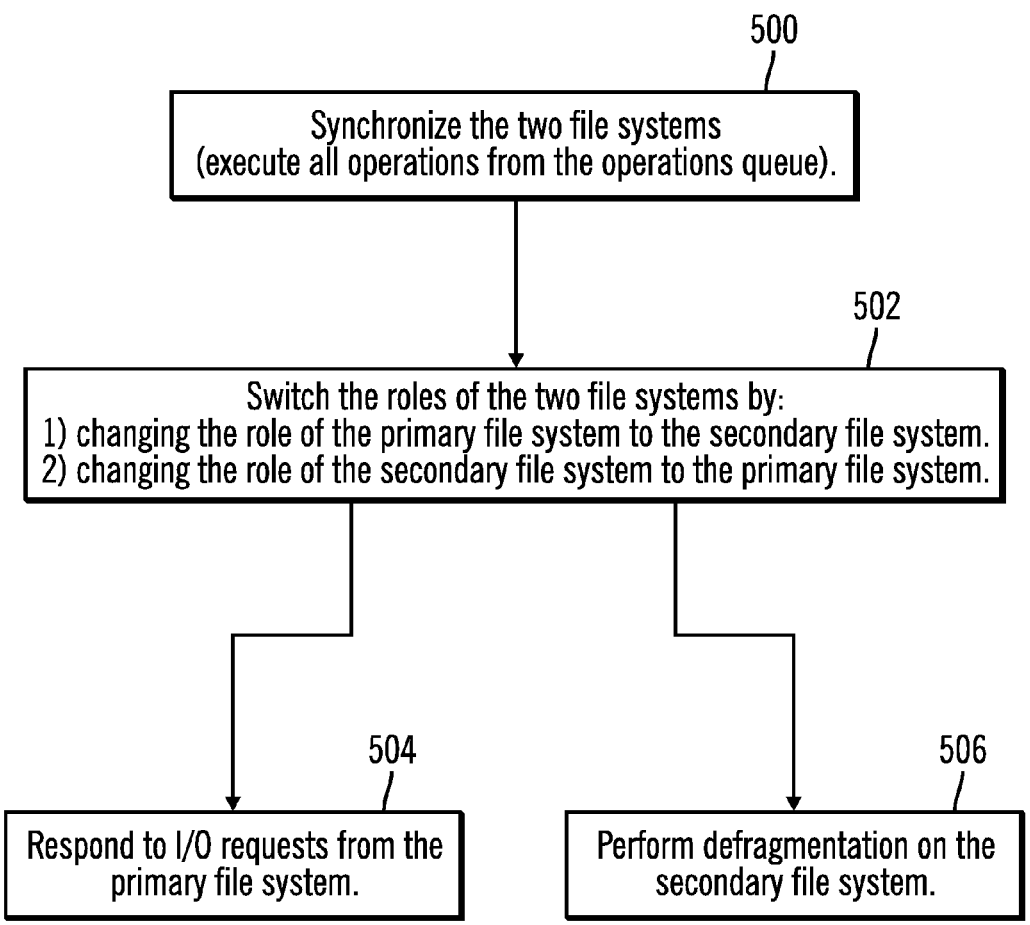
FIG. 5 illustrates a flowchart that shows second operations, in accordance with certain embodiments.

FIG. 5 illustrates a flowchart that shows second operations, in accordance with certain embodiments. The second operations shown in FIG. 5 may be performed by the file level filter application 118 that executes in the computational device 102.

Control starts at block 500 in which the file level filter application 118 synchronizes the two files systems 104, 106 by executing all operations that are pending in the operation queue 122. Control proceeds to the block 502, in which the file level filter application 118 switches the roles of the two file systems by:

1) changing the role of the primary file system 104 to the secondary file system 106; and
2) changing the role of the secondary file system 106 to the primary file system 104.

From block 502, control proceeds to block 504 and 506 in parallel, where in block 504 the file level filter application 118 responds to I/O requests from the primary file system and allows (at block 506) defragmentation to be performed on the secondary file system.

Figure 6:
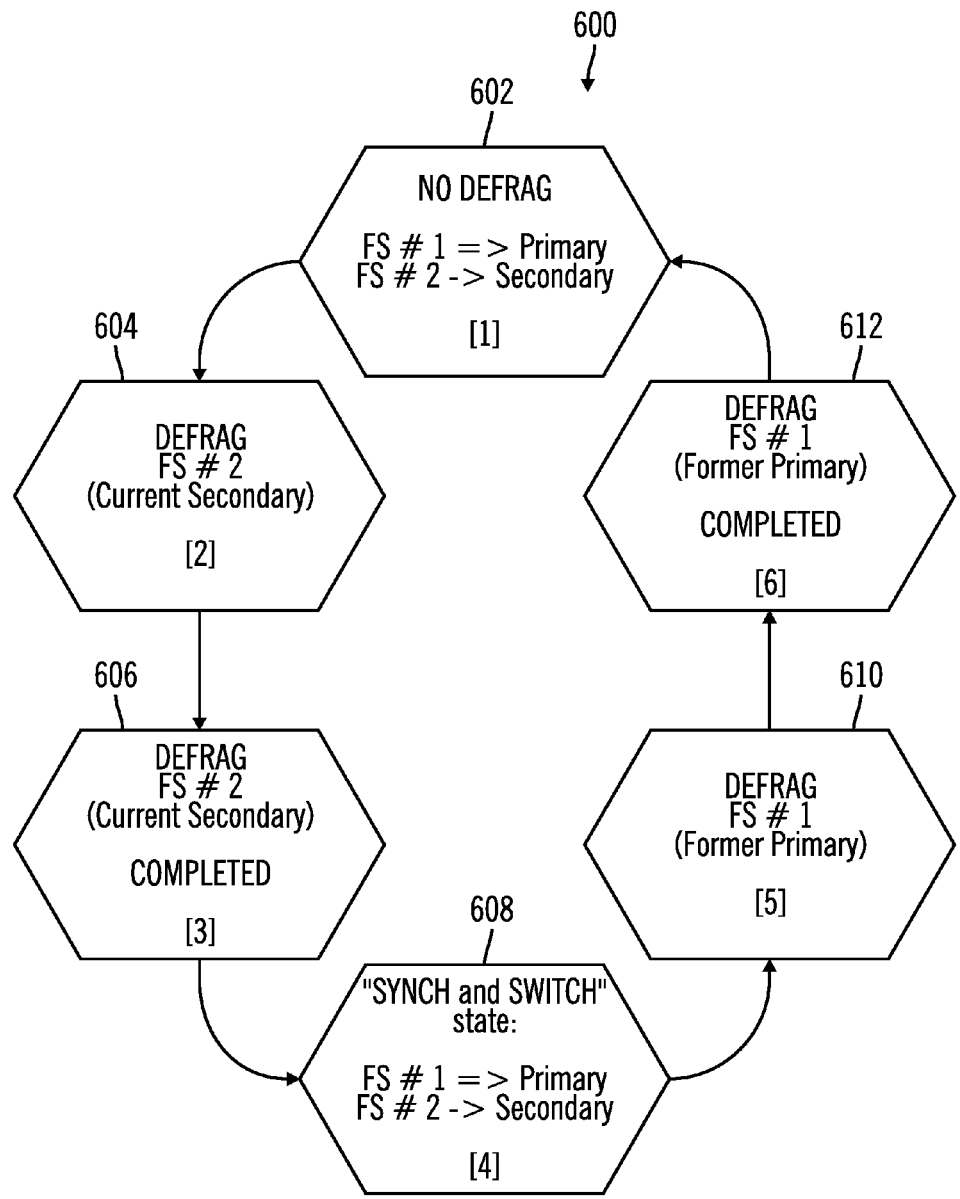
FIG. 6 illustrates a block diagram that shows defragmentation being performed alternately on a first file system and a second file system.

FIG. 6 illustrates a block diagram 600 that shows defragmentation being performed alternately on a first file system and a second file system. The first file system is referred to as FS #1 and the second file system is referred to as FS #2 in FIG. 6.

In block 602, FS #1 is the primary file system and FS #2 is the secondary file system. Control proceeds to block 604 in which FS #2 which is the current secondary file system is defragmented, and in block 606 the defragmentation is completed.

At block 608, after synchronization and switch operations, the roles of the files systems are switched as FS #2 is the current primary file system and FS #1 is the current secondary file system. Control proceeds to block 610 in which FS #1 is defragmented and the defragmentation completed in block 612, before control proceeds to block 602 once again and the roles of the file system are again switched.

Therefore, FIG. 6 illustrates certain embodiments in which the first and second file systems alternately undergo defragmentation.

Figure 7:
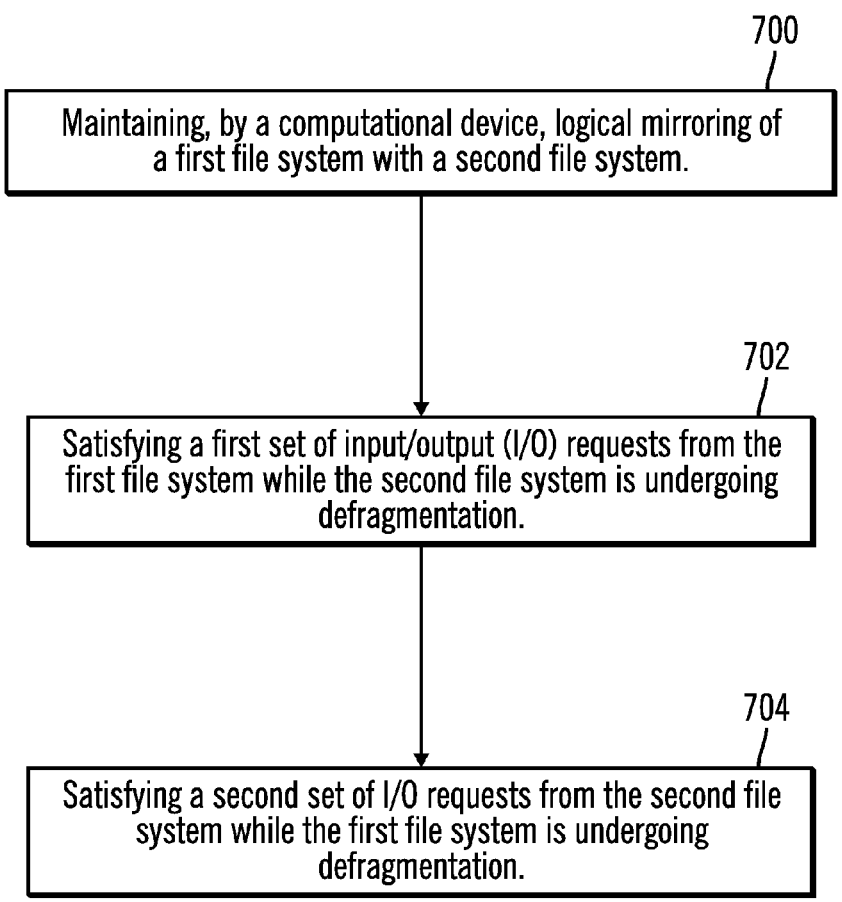
FIG. 7 illustrates a flowchart that shows third operations, in accordance with certain embodiments.

FIG. 7 illustrates a flowchart that shows third operations, in accordance with certain embodiments. The operations shown in FIG. 7 may be performed by the file level filter application 118 that executes in the computational device 102.

Control starts at block 700, in which a computational device 102 maintains logical mirroring of a first file system 104 with a second file system 106. Control proceeds to block 702, in which a first set of input/output (I/O) requests is satisfied from the first file system 104 while the second file system 106 is undergoing defragmentation. A second set of I/O requests is satisfied (at block 704) from the second file system 106 while the first file system is undergoing defragmentation.

Therefore, FIGS. 1-7 illustrate certain embodiments, in which the roles between the file systems are switched from time to time. Any write operation to a file system is duplicated asynchronously to the other one. For example, when a new file is created in a primary file system, it is queued to be created in the secondary file system. When a file is deleted in the primary file system, it is queued to be deleted in the secondary file system. When a file handle is opened in the primary file system, the same file is queued to be opened in the secondary file system (asynchronously) and the same is applicable to any operation on those file handles: e.g., seek, write etc.

The defragmentation process on the secondary file system can end when certain criteria are fulfilled. For example, defragmentation can end, when fragmentation of the file system drops under a certain threshold or when a predetermined time has elapsed.

In certain embodiments, after fragmentation ends, the mirroring process ensures that the volumes are in synchronization (i.e. the queue of operations to the secondary file system is empty). However, in case of a very high number of I/O operations in a short period of time, the queue may not be empty. Throttling of the requests on the primary can synchronize the volumes in those cases. In most situations there will likely be "quiet times" when the I/O load is lower and then the file systems may reach a synchronized state. At that time, the mirroring device may switch roles between the primary and secondary file systems, and the primary file system will be the one with lesser fragmentation. At that time, a new defragmentation process can be started on the new secondary right away or it can be triggered by some event, such as an event based on a schedule, an event based on a fragmentation level, etc. It should be noted, that in certain embodiments since all open handles on both file systems are mapped, the mirroring device can make sure that the applications continue to use the same handles that are mapped to the new primary file system.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
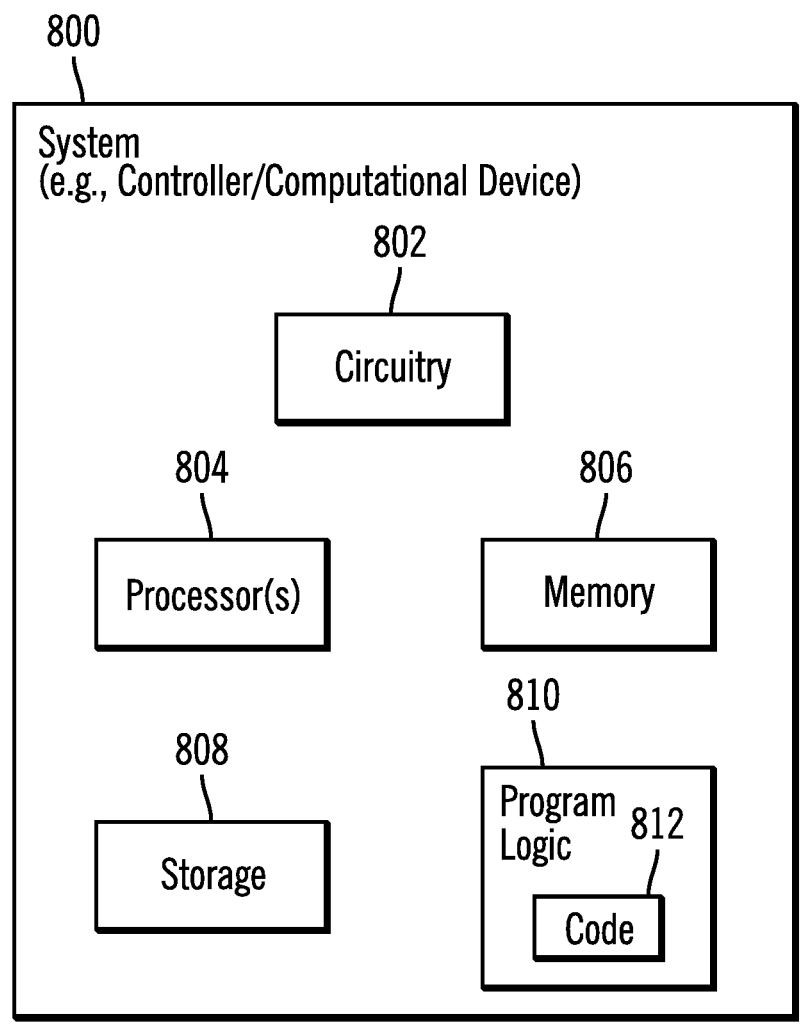
FIG. 8 illustrates a block diagram of a computational system that shows certain elements that may be included in the computational device of FIG. 1, in accordance with certain embodiments.

FIG. 8 illustrates a block diagram that shows certain elements that may be included in the computational device 102, in accordance with certain embodiments. The system 800 may comprise the computational device 102, and may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   maintaining, by a computational device, logical mirroring of a first file system with a second file system;
   satisfying a first set of input/output (I/O) requests from the first file system while the second file system is undergoing defragmentation; and
   satisfying a second set of I/O requests from the second file system while the first file system is undergoing defragmentation, wherein the first file system and the second file system correspond to a primary file system and a secondary file system, wherein I/O requests are satisfied from the primary file system and defragmentation is performed on the secondary file system, and wherein:
   while satisfying the first set of I/O requests from the first file system while the second file system is undergoing defragmentation, the first file system is the primary file system and the second file system is the secondary file system; and
   while satisfying the second set of I/O requests from the second file system while the first file system is undergoing defragmentation, the first file system is the secondary file system and the second file system is the primary file system, the method further comprising:
   receiving, a write request;
   determining that the primary file system and the secondary file system are switching states with each other;
   in response to determining that the primary file system and the secondary file system are switching states with each other, waiting for satisfying the write request until the primary file system and the secondary file system have completed switching states with each other.

2. The method of claim 1, wherein the first and second file systems alternately undergo defragmentation.

3. The method of claim 1, wherein while the secondary file system is being defragmented:
   read requests are satisfied by the primary file system; and
   write requests are synchronously satisfied by the primary file system, and placed in queue for the secondary file system for an asynchronously update.

4. The method of claim 1, wherein logical mirroring of the first file system with the second file system is performed by:
   maintaining same file structures and data on the first and the second file system, wherein the data is mapped differently on volumes of the first and the second file system.

5. The method of claim 1, wherein after completing defragmentation, the first and the second file system are synchronized by performing queued operations.

6. A system, comprising:
a memory; and
a processor coupled to the memory, wherein the processor performs operations, the operations comprising:
maintaining logical mirroring of a first file system with a second file system;
satisfying a first set of input/output (I/O) requests from the first file system while the second file system is undergoing defragmentation; and
satisfying a second set of I/O requests from the second file system while the first file system is undergoing defragmentation, wherein the first file system and the second file system correspond to a primary file system and a secondary file system, wherein I/O requests are satisfied from the primary file system and defragmentation is performed on the secondary file system, and wherein:
while satisfying the first set of I/O requests from the first file system while the second file system is undergoing defragmentation, the first file system is the primary file system and the second file system is the secondary file system; and
while satisfying the second set of I/O requests from the second file system while the first file system is undergoing defragmentation, the first file system is the secondary file system and the second file system is the primary file system, the operations further comprising:
receiving, a write request;
determining that the primary file system and the secondary file system are switching states with each other;
in response to determining that the primary file system and the secondary file system are switching states with each other, waiting for satisfying the write request until the primary file system and the secondary file system have completed switching states with each other.

7. The system of claim 6, wherein the first and second file systems alternately undergo defragmentation.

8. The system of claim 6, wherein while the secondary file system is being defragmented:
read requests are satisfied by the primary file system; and
write requests are synchronously satisfied by the primary file system, and placed in queue for the secondary file system for an asynchronously update.

9. The system of claim 6, wherein logical mirroring of the first file system with the second file system is performed by:
maintaining same file structures and data on the first and the second file system, wherein the data is mapped differently on volumes of the first and the second file system.

10. The system of claim 6, wherein after completing defragmentation, the first and the second file system are synchronized by performing queued operations.

11. A computer program product, the computer program product comprising:
a non-transitory computer readable storage medium having computer readable program code embodied therewith, the computer readable program code configured to perform operations, the operations comprising:
maintaining logical mirroring of a first file system with a second file system;
satisfying a first set of input/output (I/O) requests from the first file system while the second file system is undergoing defragmentation; and
satisfying a second set of I/O requests from the second file system while the first file system is undergoing defragmentation, wherein the first file system and the second file system correspond to a primary file system and a secondary file system, wherein I/O requests are satisfied from the primary file system and defragmentation is performed on the secondary file system, and wherein:
while satisfying the first set of I/O requests from the first file system while the second file system is undergoing defragmentation, the first file system is the primary file system and the second file system is the secondary file system; and
while satisfying the second set of I/O requests from the second file system while the first file system is undergoing defragmentation, the first file system is the secondary file system and the second file system is the primary file system, the operations further comprising:
receiving, a write request;
determining that the primary file system and the secondary file system are switching states with each other;
in response to determining that the primary file system and the secondary file system are switching states with each other, waiting for satisfying the write request until the primary file system and the secondary file system have completed switching states with each other.

12. The computer program product of claim 11, wherein the first and second file systems alternately undergo defragmentation.

13. The computer program product of claim 11, wherein while the secondary file system is being defragmented:
read requests are satisfied by the primary file system; and
write requests are synchronously satisfied by the primary file system, and placed in queue for the secondary file system for an asynchronously update.

14. The computer program product of claim 11, wherein logical mirroring of the first file system with the second file system is performed by:
maintaining same file structures and data on the first and the second file system, wherein the data is mapped differently on volumes of the first and the second file system.

* * * * *